United States Patent
Yu et al.

(10) Patent No.: US 9,053,870 B2
(45) Date of Patent: Jun. 9, 2015

(54) SUPERCAPACITOR WITH A MESO-POROUS NANO GRAPHENE ELECTRODE

(75) Inventors: Zhenning Yu, Fairborn, OH (US); David Neff, Fairborn, OH (US); Chen-guang Liu, Fairborn, OH (US); Bor Z. Jang, Centerville, OH (US); Aruna Zhamu, Centerville, OH (US)

(73) Assignee: Nanotek Instruments, Inc.

( * ) Notice: Subject to any disclaimer, the term of this patent is extended or adjusted under 35 U.S.C. 154(b) by 155 days.

(21) Appl. No.: 12/804,911

(22) Filed: Aug. 2, 2010

(65) Prior Publication Data

US 2012/0026643 A1    Feb. 2, 2012

(51) Int. Cl.
| | | |
|---|---|---|
| H01G 11/36 | (2013.01) | |
| H01G 11/02 | (2013.01) | |
| H01G 11/04 | (2013.01) | |
| H01G 11/46 | (2013.01) | |
| H01G 11/38 | (2013.01) | |
| H01G 11/24 | (2013.01) | |

(52) U.S. Cl.
CPC .............. H01G 11/36 (2013.01); H01G 11/02 (2013.01); H01G 11/04 (2013.01); H01G 11/46 (2013.01); Y02E 60/13 (2013.01); H01G 11/38 (2013.01); H01G 11/24 (2013.01)

(58) Field of Classification Search
CPC ....... H01G 11/36; H01G 11/24; H01G 11/38; H01G 11/02; H01G 11/04; H01G 11/46; Y02E 60/13
USPC .......................................................... 361/502
See application file for complete search history.

(56) References Cited

U.S. PATENT DOCUMENTS

| 2,798,878 | A | 7/1957 | Hummers | |
|---|---|---|---|---|
| 6,665,169 | B2 * | 12/2003 | Tennent et al. | 361/303 |
| 6,733,922 | B2 * | 5/2004 | Matsubara et al. | 429/231.8 |
| 7,071,258 | B1 * | 7/2006 | Jang et al. | 524/496 |
| 7,623,340 | B1 * | 11/2009 | Song et al. | 361/502 |
| 8,164,086 | B2 * | 4/2012 | Boland et al. | 257/20 |
| 2002/0118505 | A1 * | 8/2002 | O'Brien | 361/502 |
| 2003/0030963 | A1 * | 2/2003 | Tennent et al. | 361/305 |
| 2003/0108785 | A1 * | 6/2003 | Wu et al. | 429/44 |
| 2004/0017647 | A1 * | 1/2004 | Okamoto et al. | 361/502 |
| 2004/0110005 | A1 * | 6/2004 | Choi et al. | 428/402 |
| 2004/0131934 | A1 * | 7/2004 | Sugnaux et al. | 429/209 |
| 2005/0271574 | A1 * | 12/2005 | Jang et al. | 423/448 |
| 2007/0020168 | A1 * | 1/2007 | Asmussen et al. | 423/447.3 |

(Continued)

OTHER PUBLICATIONS

Du et al., Graphene nanosheets as electrode material for electric double-layer capacitor, Mar. 23, 2010, Electrochimica Acta, vol. 55, Issue 16, p. 4812-4819.*

(Continued)

*Primary Examiner* — David M Sinclair

(57) ABSTRACT

A supercapacitor comprising a two electrodes, a porous separator disposed between the two electrodes, and an ionic liquid electrolyte in physical contact with the two electrodes, wherein at least one of the two electrodes comprises a meso-porous structure being formed of a plurality of nano graphene platelets and multiple pores having a pore size in the range of 2 nm and 25 nm, wherein the graphene platelets are not spacer-modified or surface-modified platelets. Preferably, the graphene platelets are curved, not flat-shaped. The pores are accessible to ionic liquid molecules, enabling the formation of large amounts of electric double layer charges in a supercapacitor, which exhibits an exceptionally high specific capacitance and high energy density.

29 Claims, 6 Drawing Sheets

(56) References Cited

U.S. PATENT DOCUMENTS

| | | | |
|---|---|---|---|
| 2007/0109722 A1* | 5/2007 | Ohmori | 361/502 |
| 2007/0158618 A1* | 7/2007 | Song et al. | 252/500 |
| 2008/0180881 A1* | 7/2008 | Feaver et al. | 361/502 |
| 2008/0209876 A1* | 9/2008 | Miller | 55/522 |
| 2008/0225464 A1* | 9/2008 | Lashmore | 361/502 |
| 2008/0232028 A1* | 9/2008 | Zhao | 361/502 |
| 2008/0254362 A1* | 10/2008 | Raffaelle et al. | 429/188 |
| 2008/0285208 A1* | 11/2008 | Sung et al. | 361/502 |
| 2009/0047502 A1* | 2/2009 | Folaron et al. | 428/327 |
| 2009/0059474 A1* | 3/2009 | Zhamu et al. | 361/503 |
| 2009/0061312 A1* | 3/2009 | Zhamu et al. | 429/217 |
| 2009/0092747 A1* | 4/2009 | Zhamu et al. | 427/80 |
| 2009/0117467 A1* | 5/2009 | Zhamu et al. | 429/231.8 |
| 2009/0227162 A1* | 9/2009 | Kruckenberg et al. | 442/1 |
| 2009/0303660 A1* | 12/2009 | Nair et al. | 361/502 |
| 2010/0008021 A1* | 1/2010 | Hu et al. | 361/502 |
| 2010/0021819 A1* | 1/2010 | Zhamu et al. | 429/231.8 |
| 2010/0084631 A1* | 4/2010 | Boland et al. | 257/20 |
| 2010/0096595 A1* | 4/2010 | Prud'Homme et al. | 252/500 |
| 2010/0096597 A1* | 4/2010 | Prud'Homme et al. | 252/511 |
| 2010/0177462 A1* | 7/2010 | Adzic et al. | 361/502 |
| 2010/0230344 A1* | 9/2010 | Srinivas et al. | 210/285 |
| 2010/0238607 A1* | 9/2010 | Park et al. | 361/502 |
| 2010/0261058 A1* | 10/2010 | Lopatin et al. | 429/212 |
| 2010/0285354 A1* | 11/2010 | Su et al. | 429/206 |
| 2010/0296226 A1* | 11/2010 | Nanba et al. | 361/502 |
| 2011/0045350 A1* | 2/2011 | Amos et al. | 429/219 |
| 2011/0051316 A1* | 3/2011 | Liu et al. | 361/502 |
| 2011/0051322 A1* | 3/2011 | Pushparaj et al. | 361/525 |
| 2011/0075324 A1* | 3/2011 | Singh | 361/503 |
| 2011/0080689 A1* | 4/2011 | Bielawski et al. | 361/502 |
| 2011/0081575 A1* | 4/2011 | Voelker et al. | 429/217 |
| 2011/0129732 A1* | 6/2011 | Bachrach et al. | 429/220 |
| 2011/0133132 A1* | 6/2011 | Zhamu et al. | 252/503 |
| 2011/0135925 A1* | 6/2011 | Zhamu et al. | 428/367 |
| 2011/0136007 A1* | 6/2011 | Zhamu et al. | 429/209 |
| 2011/0170236 A1* | 7/2011 | Young | 361/502 |
| 2011/0183180 A1* | 7/2011 | Yu et al. | 429/128 |
| 2011/0189579 A1* | 8/2011 | Bismarck et al. | 429/479 |
| 2011/0199716 A1* | 8/2011 | Feaver et al. | 361/502 |
| 2011/0204020 A1* | 8/2011 | Ray et al. | 216/13 |
| 2011/0205688 A1* | 8/2011 | Ray et al. | 361/502 |
| 2011/0216476 A1* | 9/2011 | Fleischer et al. | 361/502 |
| 2011/0242731 A1* | 10/2011 | Fleischer et al. | 361/502 |
| 2011/0281154 A1* | 11/2011 | Vissers et al. | 429/163 |
| 2011/0287316 A1* | 11/2011 | Lu et al. | 429/215 |
| 2012/0028127 A1* | 2/2012 | Wei et al. | 429/300 |
| 2012/0063060 A1* | 3/2012 | Ohmori | 361/502 |
| 2012/0088159 A1* | 4/2012 | Thomas et al. | 429/231.8 |
| 2012/0153887 A1* | 6/2012 | Risser et al. | 320/101 |
| 2012/0154980 A1* | 6/2012 | Kinlen et al. | 361/502 |
| 2012/0313591 A1* | 12/2012 | Brambilla et al. | 320/166 |

OTHER PUBLICATIONS

U.S. Appl. No. 11/906,786, filed Oct. 4, 2007, A. Zhamu, et al.
U.S. Appl. No. 11/895,657, filed Aug. 27, 2007, A. Zhamu, et al.
U.S. Appl. No. 11/895,588, filed Aug. 27, 2007, A. Zhamu, et al.
U.S. Appl. No. 12/220,651, filed Jul. 28, 2008, A. Zhamu, et al.
U.S. Appl. No. 11/800,728, filed May 8, 2007, A. Zhamu, et al.
U.S. Appl. No. 12/655,247, filed Dec. 28, 2009, A. Zhamu, et al.
U.S. Appl. No. 12/655,744, filed Jan. 7, 2010, A.hamu, et al Z.
S. R. Vivekchand, et al., "Graphene-based Electrochemical Supercapacitor," J. Chem Sci., vol. 120 (Jan. 2008) pp. 9-13.
M. D. Stoller, et al, "Graphene-based Ultracapacitor," Nano Letters, Vo. 8 (2008) pp. 3498-3502.
Y. Shao, "Facile and Controllable Electrochemical Reduction of Graphite Oxide and its Applications," Journal of Materials Chemistry, 20 (2010) 743-748.
Y. Wang, "Supercapacitor Devices Based on Graphene Materials," J. Phys. Chem., C. 113 (2009) 13103-13107.
H. Wang, et al., "Graphene Oxide Doped Polyaniline for Supercapacitors," Electrochem. Communications, 11 (2009) 1158-1161.
Y. P. Zhang, et al. "Capacitive Behavior of Graphene-ZnO Composite Film for Supercapacitors," J. Electroanalytical Chem., 634 (2009) 68-71.
W. Lv, et al. "Low-Temperature Exfoliated Graphenes: Vacuum-Promoted Exfoliation and Electrochemical Energy Storage," ACS Nano 2009, 3, 3730-3736.

* cited by examiner

16. S. Vivekchand, et al. *J. Chem. Sci.* 2008, *120*, 9–13.
17. M. D. Stoller, et al. *Nano Lett.* 2008, *8*, 3498–3502.
18. Y. Wang, et al. *J. Phys. Chem. C* 2009, *113*, 13103-13107.
19. W. Lv, et al. *ACS Nano* 2009, *3*, 3730-3736.

SUPERCAPACITOR WITH A MESO-POROUS NANO GRAPHENE ELECTRODE

This invention is based on the research results of a project sponsored by the US Department of Commerce NIST Technology Innovation Program. The US government has certain rights on this invention.

FIELD OF THE INVENTION

The present invention relates generally to the field of supercapacitors or ultracapacitors, and more particularly to the nano graphene platelet-based electrode and supercapacitors containing such an electrode.

BACKGROUND OF THE INVENTION

Electrochemical capacitors (ECs), also known as ultracapacitors or supercapacitors, are being considered for uses in hybrid electric vehicles (EVs) where they can supplement a battery used in an electric car to provide bursts of power needed for rapid acceleration, the biggest technical hurdle to making battery-powered cars commercially viable. A battery would still be used for cruising, but capacitors (with their ability to release energy much more quickly than batteries) would kick in whenever the car needs to accelerate for merging, passing, emergency maneuvers, and hill climbing. The EC must also store sufficient energy to provide an acceptable driving range. To be cost- and weight-effective compared to additional battery capacity they must combine adequate specific energy and specific power with long cycle life, and meet cost targets as well. Specifically, it must store about 400 Wh of energy, be able to deliver about 40 kW of power for about 10 seconds, and provide high cycle-life (>100,000 cycles).

ECs are also gaining acceptance in the electronics industry as system designers become familiar with their attributes and benefits. ECs were originally developed to provide large bursts of driving energy for orbital lasers. In complementary metal oxide semiconductor (CMOS) memory backup applications, for instance, a one-Farad EC having a volume of only one-half cubic inch can replace nickel-cadmium or lithium batteries and provide backup power for months. For a given applied voltage, the stored energy in an EC associated with a given charge is half that storable in a corresponding battery system for passage of the same charge. Nevertheless, ECs are extremely attractive power sources. Compared with batteries, they require no maintenance, offer much higher cycle-life, require a very simple charging circuit, experience no "memory effect," and are generally much safer. Physical rather than chemical energy storage is the key reason for their safe operation and extraordinarily high cycle-life. Perhaps most importantly, capacitors offer higher power density than batteries.

The high volumetric capacitance density of an EC (10 to 100 times greater than conventional capacitors) derives from using porous electrodes to create a large effective "plate area" and from storing energy in the diffuse double layer. This double layer, created naturally at a solid-electrolyte interface when voltage is imposed, has a thickness of only about 1 nm, thus forming an extremely small effective "plate separation." In some ECs, stored energy is further augmented by pseudo-capacitance effects, occurring again at the solid-electrolyte interface due to electrochemical phenomena such as the redox charge transfer. The double layer capacitor is based on a high surface area electrode material, such as activated carbon, immersed in an electrolyte. A polarized double layer is formed at electrode-electrolyte interfaces providing high capacitance. This implies that the specific capacitance of a supercapacitor is directly proportional to the specific surface area of the electrode material. This surface area must be accessible by electrolyte and the resulting interfacial zones must be sufficiently large to accommodate the so-called double-layer charges.

Experience with ECs based on activated carbon electrodes shows that the experimentally measured capacitance is always much lower than the geometrical capacitance calculated from the measured surface area and the width of the dipole layer. For very high surface area carbons, typically only about ten percent of the "theoretical" capacitance was observed. This disappointing performance is related to the presence of micro-pores and ascribed to inaccessibility of some pores by the electrolyte, wetting deficiencies, and/or the inability of a double layer to form successfully in pores in which the oppositely charged surfaces are less than about 2 nm apart. In activated carbons, depending on the source of the carbon and the heat treatment temperature, a surprising amount of surface can be in the form of such micro-pores.

It would be desirable to produce an EC that exhibits greater geometrical capacitance using a carbon based electrode having a high accessible surface area, high porosity, and reduced or no micro-pores. It would be further advantageous to develop carbon-based nano-structures that are conducive to the occurrence of pseudo-capacitance effects, such as the redox charge transfer.

Carbon nanotubes (CNT) are nanometer-scale sized tube-shaped molecules having the structure of a graphite molecule rolled into a rube. A nanotube can be single-walled or multi-walled, dependent upon conditions of preparation. Carbon nanotubes typically are electrically conductive and mechanically strong and stiff along their length. CNTs are being studied for electrochemical supercapacitor electrodes due to their unique properties and structure, which include high specific surface area (e.g. up to 1,300 $m^2/g$), high conductivity, and chemical stability. Capacitance values from 20 to 180 F/g have been reported, depending on CNT purity and electrolyte, as well as on specimen treatment such as $CO_2$ physical activation, KOH chemical activation, or exposure to nitric acid, fluorine, or ammonia plasma. Conducting polymers, such as polyacetylene, polypyrrole, polyaniline, polythiophene, and their derivatives, are also common electrode materials for supercapacitors. The modification of CNTs with conducting polymers is one way to increase the capacitance of the composite resulting from redox contribution of the conducting polymers. In the CNT/conducting polymer composite, CNTs are electron acceptors while the conducting polymer serves as an electron donor. A charge transfer complex is formed between CNTs in their ground state and aniline monomer. A number of studies on CNT/conducting polymer composites for electrochemical capacitor applications have been reported.

However, there are several drawbacks associated with carbon nanotube-filled composites. First, CNTs are known to be extremely expensive due to the low yield, low production rate, and low purification rate commonly associated with the current CNT preparation processes. The high material costs have significantly hindered the widespread application of CNTs. Second, CNTs tend to form a tangled mess resembling a hairball, which is difficult to work with (e.g., difficult to disperse in a liquid solvent or resin matrix). This and other difficulties have significantly limited the scope of application of CNTs.

Instead of trying to develop much lower-cost processes for making CNTs, researchers at Nanotek Instruments, Inc. have worked diligently to develop alternative nano-scaled carbon materials that exhibit comparable properties and can be mass-produced at much lower costs. This development work has led to the discovery of processes for producing individual nano-scaled graphite planes (individual single-layer graphene sheets) and stacks of multiple graphene sheets, which are collectively called nano graphene platelets (NGPs). A single-layer graphene sheet is basically a 2-D hexagon lattice of $sp^2$ carbon atoms covalently bonded along two plane directions. The sheet is essentially one carbon atom thick, which is smaller than 0.34 nm. The structures of NGPs may be best visualized by making a longitudinal scission on the single-wall or multi-wall of a nano-tube along its tube axis direction and then flattening up the structure to form a single-layer or multi-layer graphene platelet. In practice, NGPs are obtained from a precursor material, such as graphite particles, using a low-cost process, but not via flattening of CNTs. These nano materials are cost-effective substitutes for CNTs or other types of nano-rods for various scientific and engineering applications. In the present context, NGPs refer to pristine, non-oxidized graphene, graphene oxide (GO), or chemically or thermally reduced GO. The oxygen content is typically ranged from essentially 0% (pristine graphene) to approximately 40% (heavily oxidized graphite or graphene oxide). The chemically or thermally reduced GO typically has an oxygen content from 1% to 20%, more typically from 1% to 5%.

Nano graphene materials have recently been found to exhibit exceptionally high thermal conductivity, high electrical conductivity, and high strength. As a matter of fact, single-layer graphene exhibits the highest thermal conductivity and highest intrinsic strength of all currently known materials. Another outstanding characteristic of graphene is its exceptionally high specific surface area. A single graphene sheet provides a specific external surface area of approximately 2,675 $m^2/g$ (that is accessible by liquid electrolyte), as opposed to the exterior surface area of approximately 1,300 $m^2/g$ provided by a corresponding single-wall CNT (interior surface not accessible by electrolyte). The electrical conductivity of graphene is slightly higher than that of CNTs.

Two of the instant applicants (A. Zhamu and B. Z. Jang) and their colleagues were the first to investigate NGP- and other nano graphite-based nano materials for supercapacitor application [Please see Refs. 1-5 below; the $1^{st}$ patent application was submitted in 2006 and issued in 2009]. After 2007, researchers began to gradually realize the significance of nano graphene materials for supercapacitor applications [Refs. 6-12].

LIST OF REFERENCES

1. Lulu Song, A. Zhamu, Jiusheng Guo, and B. Z. Jang, "Nano-scaled Graphene Plate Nanocomposites for Supercapacitor Electrodes" U.S. Pat. No. 7,623,340 (Nov. 24, 2009).
2. Aruna Zhamu and Bor Z. Jang, "Process for Producing Nano-scaled Graphene Platelet Nanocomposite Electrodes for Supercapacitors," U.S. patent application Ser. No. 11/906,786 (Oct. 4, 2007).
3. Aruna Zhamu and Bor Z. Jang, "Graphite-Carbon Composite Electrodes for Supercapacitors" U.S. patent application Ser. No. 11/895,657 (Aug. 27, 2007).
4. Aruna Zhamu and Bor Z. Jang, "Method of Producing Graphite-Carbon Composite Electrodes for Supercapacitors" U.S. patent application Ser. No. 11/895,588 (Aug. 27, 2007).
5. Aruna Zhamu and Bor Z. Jang, "Graphene Nanocomposites for Electrochemical cell Electrodes," U.S. patent application Ser. No. 12/220,651 (Jul. 28, 2008).
6. S. R. Vivekchand, et al., "Graphene-based Electrochemical Supercapacitor," J. Chem Sci., Vol. 120 (January 2008) pp. 9-13.
7. M. D. Stoller, et al, "Graphene-based Ultracapacitor," Nano Letters, Vo. 8 (2008) pp. 3498-3502.
8. Y. Shao, "Facile and Controllable Electrochemical Reduction of Graphite Oxide and its Applications," Journal of Materials Chemistry, 20 (2010) 743-748.
9. X. Zhao, "Supercapacitors Using Carbon Nanosheets as Electrode," US Pat. Pub. No. 2008/0232028 (Sep. 25, 2008).
10. Y. Wang, "Supercapacitor Devices Based on Graphene Materials," J. Phys. Chem., C. 113 (2009) 13103-13107.
11. H. Wang, et al., "Graphene Oxide Doped Polyaniline for Supercapacitors," Electrochem. Communications, 11 (2009) 1158-1161.
12. Y. P. Zhang, et al. "Capacitive Behavior of Graphene-ZnO Composite Film for Supercapacitors," J. Electroanalytical Chem., 634 (2009) 68-71.

However, these workers have failed to recognize the notion that individual nano graphene sheets have a great tendency to re-stack themselves, effectively reducing the specific surface areas that are accessible by the electrolyte in a supercapacitor electrode. The significance of this graphene sheet overlap issue may be illustrated as follows: For a nano graphene platelet with dimensions of l (length)×w (width)×t (thickness) and density ρ, the estimated surface area per unit mass is $S/m=(2/\rho)(1/l+1/w+1/t)$. With ρ≅2.2 $g/cm^3$, l=100 nm, w=100 nm, and t=0.34 nm (single layer), we have an impressive S/m value of 2,675 $m^2/g$, which is much greater than that of most commercially available carbon black or activated carbon materials used in the state-of-the-art supercapacitor. If two single-layer graphene sheets stack to form a double-layer NGP, the specific surface area is reduced to 1,345 $m^2/g$. For a three-layer NGP, t=1 nm, we have S/m=906 $m^2/g$. If more layers are stacked together, the specific surface area would be further significantly reduced. These calculations suggest that it is essential to find a way to prevent individual graphene sheets to re-stack and, even if they re-stack, the resulting multi-layer structure would still have inter-layer pores of adequate sizes. These pores must be sufficiently large to allow for accessibility by the electrolyte and to enable the formation of electric double-layer charges, which typically require a pore size of at least 1-2 nm for aqueous electrolyte.

To overcome this graphene re-stacking problem, the applicants have recently discovered a so-called spacer-modified graphene approach (also referred to as surface-modified graphene approach), which is summarized in the following two patent applications [Refs. 13 and 14]:

13. Aruna Zhamu, Zenning Yu, C, G. Liu, and Bor Z. Jang, "Spacer-Modified Nano Graphene Electrodes for Supercapacitors," U.S. patent application Ser. No. 12/655,247 (Dec. 28, 2009).
14. Aruna Zhamu, Zenning Yu, C, G. Liu, and Bor Z. Jang, "Continuous Process for Producing Spacer-Modified Nano Graphene Electrodes for Supercapacitors," U.S. patent application Ser. No. 12/655,744 (Jan. 7, 2010).

According to the above two references [13, 14], a surface-modified or spacer-modified nano graphene platelet (NGP) comprises: (a) a nano graphene platelet having a thickness smaller than 10 nm; and (b) discrete, non-continuous, and non-metallic bumps or nodules bonded to a surface of the graphene platelet to serve as a spacer. When multiple surface-modified NGP sheets are stacked together to form an electrode, the spacer nodules help to prevent complete face-to-face re-stacking of graphene sheets, enabling the formation of electrolyte-accessible pores in which double layer charges are developed when a voltage is applied. Surface modifications were achieved by using a spacer approach in which nano-scaled spacer particles are chemically bonded to a surface of a graphene sheet. This strategy results in a supercapacitor that exhibits an exceptionally high specific capacitance.

However, this spacer particle approach requires an extra step of creating spacer particles that are bonded to graphene surfaces as discrete particles. Further, in this earlier discovery [Refs. 13 and 14], the specific surface area with a unit of $m^2/g$ was used as the index to characterize the open surface areas of graphene. This was measured using the well-known Brunauer-Emmett-Teller (BET) method based on nitrogen adsorption. In other words, the specific surface area measured was the total surface area per gram of graphene that was accessible to nitrogen molecules ($N_2$). Nitrogen molecular size might be comparable to the size of aqueous electrolyte molecules (e.g., KOH) and, hence, might be a good index for use in the aqueous electrolyte supercapacitor electrodes. However, the small pores that are accessible to KOH might not be accessible to larger electrolyte molecules, such as ionic liquids. This issue has never been addressed in the supercapacitor research community.

Most significantly, select ionic liquids, when used as an electrolyte, can have a stable electrochemical window (operating voltage) as high as 2.5-6 volts. The actual voltage magnitude is presumably dependent upon the nature of ionic liquid, the surface chemistry of the electrode, and the chemical and physical compatibility between the ionic liquid and the electrode. However, there has been no available rule or guideline that allows for the prediction, design, or selection of a proper ionic liquid with a high operating voltage that could be used in concert with a new supercapacitor electrode material, such as nano graphene platelet. Furthermore, there was no known information about the pore sizes of a graphene-based supercapacitor electrode and how these pore sizes would affect the performance of a supercapacitor electrode with respect to an ionic liquid. There was no knowledge on the proper pore sizes that would allow an ionic liquid to enter and to develop electric double layers of charges therein. For these reasons we conducted an extensive and in-depth study to address these critical issues in the art of supercapacitors. The invention herein reported is a result of these diligent research and development efforts.

SUMMARY OF THE INVENTION

One preferred embodiment of the present invention is a supercapacitor comprising a first electrode, a second electrode, a porous separator disposed between the first and the second electrode, and an ionic liquid electrolyte in physical contact with the two electrodes, wherein at least one of the two electrodes comprises a meso-porous structure being formed of a plurality of nano graphene platelets (NGPs) and multiple pores having a pore size in the range of 2 nm and 25 nm, wherein the graphene platelets are not spacer-modified platelets (also referred to as surface-modified platelets).

In other words, surface bumps or nodules (for the purpose of preventing graphene sheets from closely re-stacking) are not required to produce the desired meso-pores. Meso-pores are typically defined as pores having a size in the range of 2 nm to 50 nm. However, the preferred pore range in the instant invention is between 2 nm and 25 nm. Instead of using a spacer approach in our earlier inventions, we now have developed a new approach that entails producing curved nano graphene platelets or sheets (FIG. 1), as opposed to relatively flat NGPs (FIG. 2) that are made by using conventional methods. Quite surprisingly, the presently invented curved NGPs are capable of preventing NGPs from closely re-stacking with one another when they are packed or compressed into an electrode structure, thereby maintaining a meso-porous structure having a pore size in the range of 2 to 25 nm, preferably in the range of 3 to 25 nm, further preferably in the range of 4 to 25 nm, and most preferably in the range of 4 to 15 nm.

These pore sizes were judiciously selected after an extensive and in-depth study of a large number of electrodes with different pore sizes conducted by us. We discovered that pores smaller than 2 nm in size are difficult for ionic liquid molecules to enter and pores smaller than 4 nm are difficult for electric double layer (EDL) to form therein. Preferably, a size of the pores is at least three times that of a molecular size of the ionic liquid. Based on our calculations, molecular sizes of ionic liquids are typically in the range of 1.2 nm to 1.6 nm. Although a minimum pore size of 2 nm is acceptable, a minimum of 4 nm is preferred.

In another preferred embodiment, both electrodes comprise a meso-porous structure being formed of a plurality of nano graphene platelets and multiple pores having a pore size in the range of 2 nm and 25 nm. Most preferably, both electrodes comprise curved nano graphene platelets that enable the easy formation of meso-pores in the range of 2 nm and 25 nm.

Preferably, the ionic liquid is a room temperature ionic liquid. In other words, at room temperature, this electrolyte is in a liquid state, not solid state. Preferably, the ionic liquid has a molecular size smaller than a pore size of the multiple pores. Most preferably, a pore size is greater than 3-4 times that of an ionic liquid molecular size.

Nano graphene platelets most preferably comprise single-layer graphene. Most preferably, the majority of NGPs are single-layer graphene. NGPs may comprise an oxidized graphene or graphene oxide sheet, or a chemically or thermally reduced graphene oxide sheet.

The electrode can further comprise a nano material selected from a carbon nano-tube, carbon nano-fiber, activated carbon, carbon black, nano-wire, metal oxide nano-wire or fiber, conductive polymer nano-fiber, or a combination thereof. This nano material is not bonded to a graphene sheet to form a spacer-modified graphene sheet.

The electrode may further comprise a matting material selected from the group consisting of $RuO_2$, $IrO_2$, NiO, $MnO_2$, $VO_x$, $TiO_2$, $Cr_2O_3$, $Co_2O_3$, $PbO_2$, $Ag_2O$, $MoC_x$, $Mo_2N$, $WC_x$, $WN_x$, a transition metal oxide, and combinations thereof. Such a matting material, when paired up with an NGP, can produce a redox or pseudo-capacitance effect. Alternatively, the electrode may comprise a conductive polymer that forms a redox pair with a nano graphene platelet. There is no particular limitation on the type of intrinsically conductive polymer that can be chosen as a matting material for graphene to form a redox pair. But, preferably, the conducting polymer may be polyacetylene, polypyrrole, polyaniline, polythiophene, and or their derivatives.

The nano graphene platelets may be activated to form activated platelets, and/or chemically functionalized. NGPs may be functionalized with one or more functional groups selected from the group consisting of —$SO_3$, —R'COX, —R'(COOH)$_2$, —CN, —R'CH$_2$X, —OH, —R'CHO, —R'CN, wherein R' is a hydrocarbon radical, and wherein X is —NH$_2$, —OH, or a halogen.

Quite surprisingly, the graphene-based meso-porous electrode, in combination with an ionic liquid, provides a supercapacitor with an energy density typically greater than 100 Wh/kg (often greater than 150 Wh/kg) based on the total electrode weight. This value was achieved with the electric double layer (EDL) mechanism alone, without a contribution from the pseudo-capacitance mechanism. If a redox pair is formed, the capacitance can be further increased. The ionic liquids were found to operate at a voltage significantly greater than 3.5 volts, often greater than 4.5 volts in our graphene electrode-based supercapacitor cells.

DESCRIPTION OF THE PREFERRED EMBODIMENTS

Figure 1A:
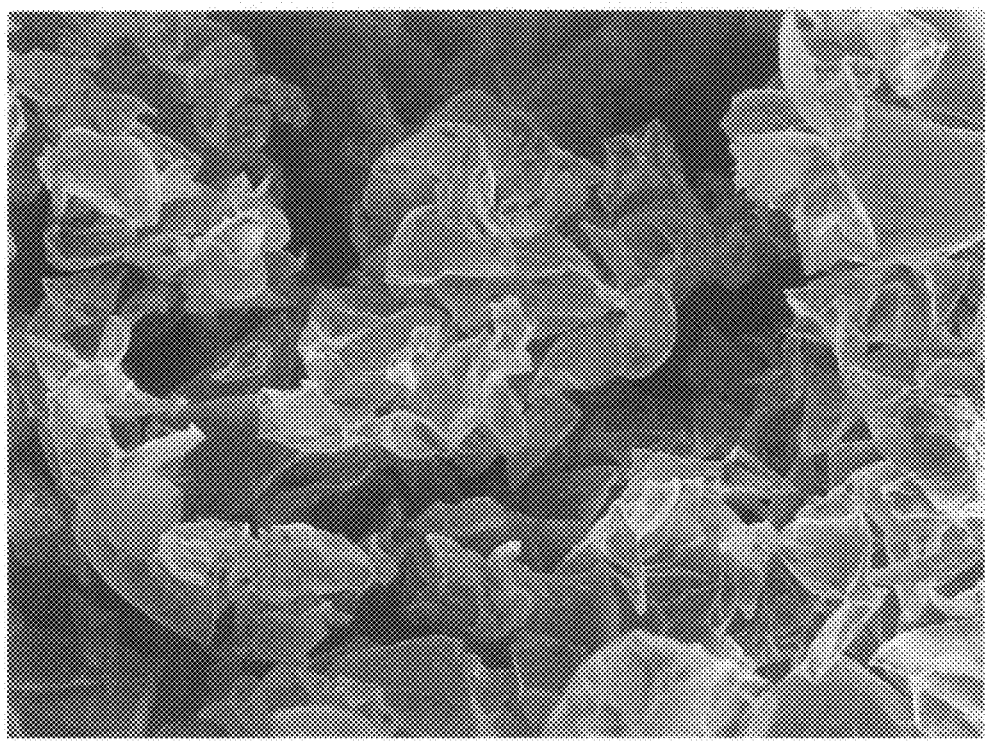
FIG. 1 (a) A scanning electron microscopic image of curved NGPs that are particularly amenable to forming desired meso-pores when these NGPs are packed together to form a supercapacitor electrode; (b) A transmission electron microscopic image of flat NGPs prepared by using a conventional process.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

For the purpose of defining the geometry of an NGP, the NGP is described as having a length (the largest dimension), a width (the second largest dimension), and a thickness. The thickness is the smallest dimension, which is no greater than 100 nm and, in the present application, no greater than 10 nm (preferably no greater than 2 nm, more preferably no greater than 1 nm, and most preferably no greater than 0.4 nm, or single-layer graphene only). When the platelet is approximately circular in shape, the length and width are referred to as diameter. In the presently defined NGPs, there is no limitation on the length and width, but they are preferably smaller than 10 μm and more preferably smaller than 1 μm. We have been able to produce NGPs with length smaller than 100 nm or larger than 10 μm. The NGP can be pristine graphene (with essentially 0% oxygen content) or graphene oxide (with up to approximately 40% by weight oxygen). Graphene oxide can be thermally or chemically reduced to become reduced graphene oxide (typically with <5% oxygen).

Despite the fact that individual graphene sheets have an exceptionally high specific surface area, flat-shaped graphene sheets prepared by conventional routes have a great tendency to re-stack together or overlap with one another, thereby dramatically reducing the specific surface area that is accessible by the electrolyte. This phenomenon is illustrated in FIG. 2, wherein several single-layer graphene sheets overlap and re-stack tightly. There is no discernable gap or pore between two graphene sheets that are overlapped together. By contrast, FIG. 1 shows a new breed of graphene that is herein referred to as the curved graphene platelet or sheet. We were surprised to observe that curved NGPs of the instant invention were capable of forming a meso-porous structure having a desired pore size range (e.g. 2-25 nm, mostly 4-15 nm) when they were stacked together to form an electrode. Further surprisingly, this size range appears to be conducive to being accessible by an ionic liquid, which is significantly larger in size than other types of electrolyte molecules (e.g., KOH in an aqueous electrolyte). The meso pores constituted by the presently invented curved NGPs also appear to be capable of forming electric double layer charges therein, leading to an exceptionally high specific capacitance.

Further, we were also surprised to observe that the curved NGP-based electrode appears to be highly compatible with ionic liquid electrolyte, enabling the ionic liquid to be operated at an exceptionally high voltage, V (V typically >3.5 volts and often >4.5 volts). A larger working voltage implies a much higher specific energy density according to $E=\frac{1}{2}C_{cell}V^2$, where $C_{cell}$=specific capacitance of the cell.

The curved NGPs may be produced by using the following procedures:
(a) dispersing or immersing a laminar graphite material (e.g., natural graphite powder) in a mixture of an intercalant and an oxidant (e.g., concentrated sulfuric acid and nitric acid, respectively) to obtain a graphite intercalation compound (GIC) or graphite oxide (GO);
(b) exposing the resulting GIC or GO to a thermal shock, preferably in a temperature range of 600-1,100° C. for a short period of time (typically 15 to 60 seconds), to obtain exfoliated graphite or graphite worms (some oxidized NGPs with a thickness <100 nm could be formed at this stage if the intercalation/oxidation step was allowed to proceed for a sufficiently long duration of time; e.g. 24 hours);
(c) re-dispersing the exfoliated graphite to a liquid medium containing an acid (e.g., sulfuric acid), an oxidizing agent (e.g. nitric acid), or an organic solvent (e.g., NMP) to form a suspension. Stirring, mechanical shearing, or ultrasonication can be used to break up graphite worms to form oxidized NGPs to accelerate the dispersion step;
(d) aerosolizing the graphene-liquid solution into liquid droplets containing single or multiple NGPs while concurrently removing the liquid to recover curved NGPs.

It may be noted that steps (a) to (c) are the most commonly used steps to obtain graphene oxide platelets in the field. However, we were surprised to observe that step (d) was capable of producing curved graphene sheets. Oxidized NGPs or GO platelets may be chemically reduced to recover conductivity properties using hydrazine as a reducing agent.

Hence, one preferred embodiment of the present invention is a supercapacitor comprising a first electrode, a second electrode, a porous separator disposed between the first and the second electrode, and an ionic liquid electrolyte in physical contact with the two electrodes, wherein at least one of the two electrodes comprises a meso-porous structure being formed of a plurality of nano graphene platelets (NGPs) and multiple pores having a pore size in the range of 2 nm and 25 nm, wherein the graphene platelets are not spacer-modified platelets (also referred to as surface-modified platelets). Preferably, both electrodes in a cell are meso-porous having a pore size in the range of 2 nm and 25 nm.

In a preferred embodiment, the electrode may further contain a material selected from the group consisting of metal oxide (e.g. transition metal oxide), metal carbide, metal nitride, metal sulfide, and combinations thereof. Preferably, this material is selected from the group consisting of $RuO_2$, $IrO_2$, NiO, $MnO_2$, $VO_x$, $PbO_2$, $Ag_2O$, $MoC_x$, $Mo_2N$, $WC_x$, $WN_x$, and combinations thereof. This material is preferably in a thin-film or coating form deposited onto an NGP surface to form a redox pair with NGP.

Another embodiment of the present invention is a supercapacitor comprising two electrodes, a porous separator disposed between the two electrodes, and electrolyte in physical contact with the two electrodes, wherein at least one, preferably both, of the two electrodes comprises a curved NGP-based, meso-porous electrode as defined above.

The NGPs used in the aforementioned electrode may be subjected to the following treatments, separately or in combination, before or after the electrode fabrication operation:
(a) chemically functionalized;
(b) coated or grafted with a conductive polymer;
(c) deposition with transition metal oxides or sulfides, such as $RuO_2$, $TiO_2$, $MnO_2$, $Cr_2O_3$, and $CO_2O_3$, for the purpose of imparting pseudo-capacitance to the electrode (not as a spacer);
(d) subjected to an activation treatment (analogous to activation of carbon black materials) to create additional surfaces and possibly imparting functional chemical groups to these surfaces. The activation treatment can be accomplished through $CO_2$ physical activation, KOH chemical activation, or exposure to nitric acid, fluorine, or ammonia plasma.

Conducting polymers, such as polyacetylene, polypyrrole, polyaniline, polythiophene, and their derivatives, are good choices for use to form a redox pair with graphene in the present invention. These treatments are intended for further increasing the capacitance value through pseudo-capacitance effects such as redox reactions. Alternatively, transition metal oxides or sulfides such as $RuO_2$, $TiO_2$, $MnO_2$, $Cr_2O_3$, and $CO_2O_3$ can be deposited onto the NGP surface for pseudo-capacitance. Other useful surface functional groups may include quinone, hydroquinone, quaternized aromatic amines, mercaptans, or disulfides.

The following examples serve to illustrate the preferred embodiments of the present invention and should not be construed as limiting the scope of the invention:

EXAMPLE 1

Oxidation, Exfoliation, and De-Oxygenation of Natural Graphite

Graphite oxide was prepared by oxidation of natural flake graphite with sulfuric acid, sodium nitrate, and potassium permanganate at a ratio of 4:1:0.05 at 30° C. for 24 hours, according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue outside of graphite interstices. The slurry was then dried and stored in a vacuum oven at 60° C. for 24 hours.

The dried, intercalated (oxidized) compound was placed in a quartz tube that was inserted into a horizontal tube furnace pre-set at 1,050° C. to effect exfoliation for 1 minute. The resulting exfoliated graphite was dispersed in water and subjected to ultrasonication for 30 minutes to obtain a nano graphene oxide suspension. The suspension was then aerosolized or atomized using an atomizer head to produce NGP-containing liquid droplets. The liquid content of these droplets was rapidly decreased to the extent that individual curved graphene sheets or platelets are formed.

The electrodes were made of graphene, mixed with 5 wt % Super-P® and 10 wt % polytetrafluoroethylene (PTFE) binder. The mass of each electrode is 6.6 mg with a diameter of 13 mm. Coin-size capacitor cells were assembled in a glove box. A supercapacitor unit cell comprises two electrodes that were electrically isolated from each other by a Celguard-3501 porous membrane. The ionic liquid electrolyte was 1-ethyl-3-methylimidazolium tetrafluoroborate ($EMIMBF_4$):

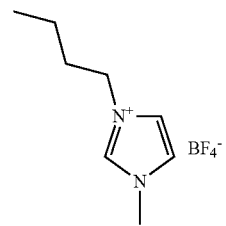

Figure 1B:
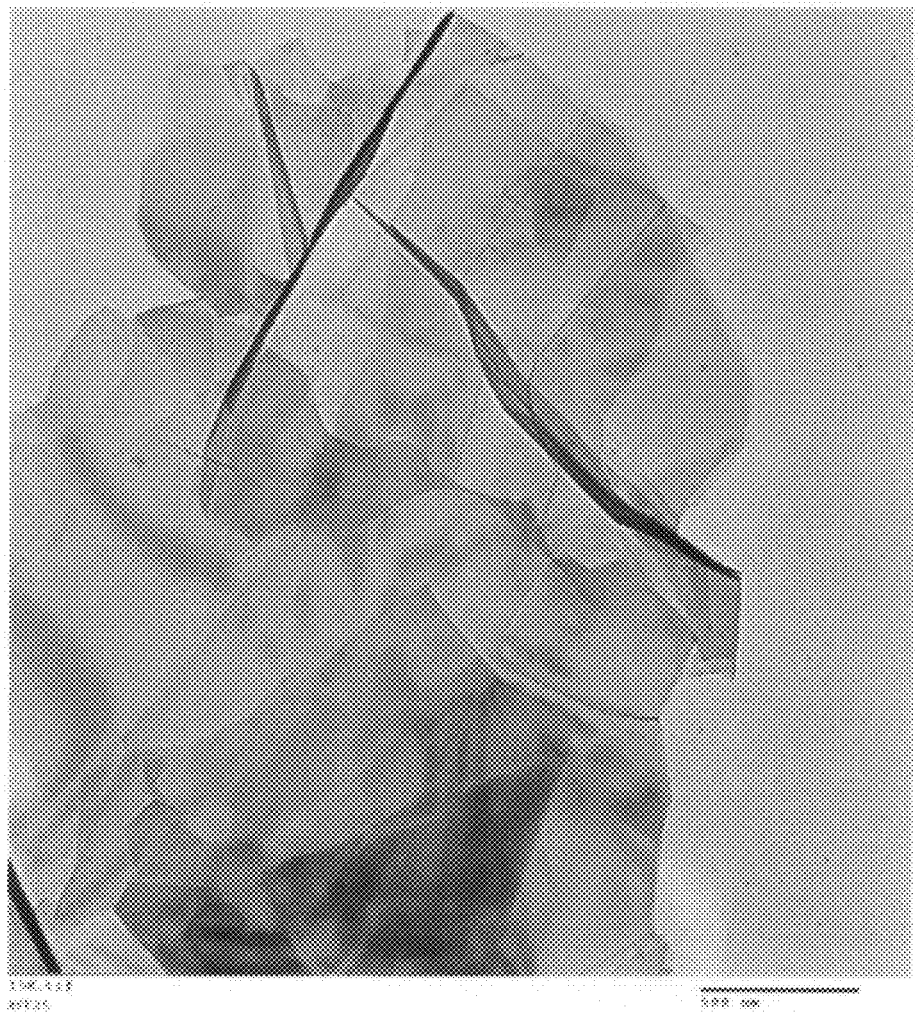
Figure 2A:
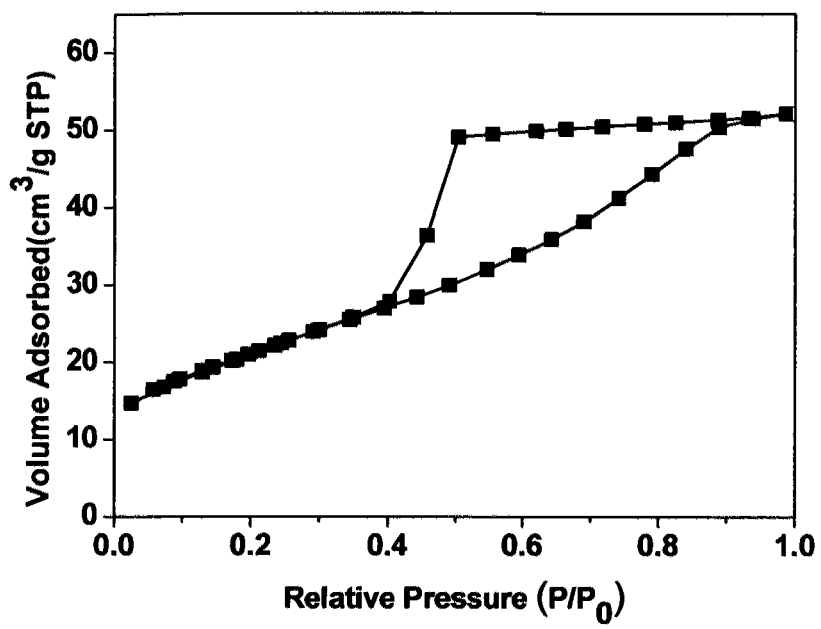
FIG. 2 (a) Nitrogen adsorption isotherms, and (b) Pore size distribution of the meso-porous graphene material.
Figure 2B:
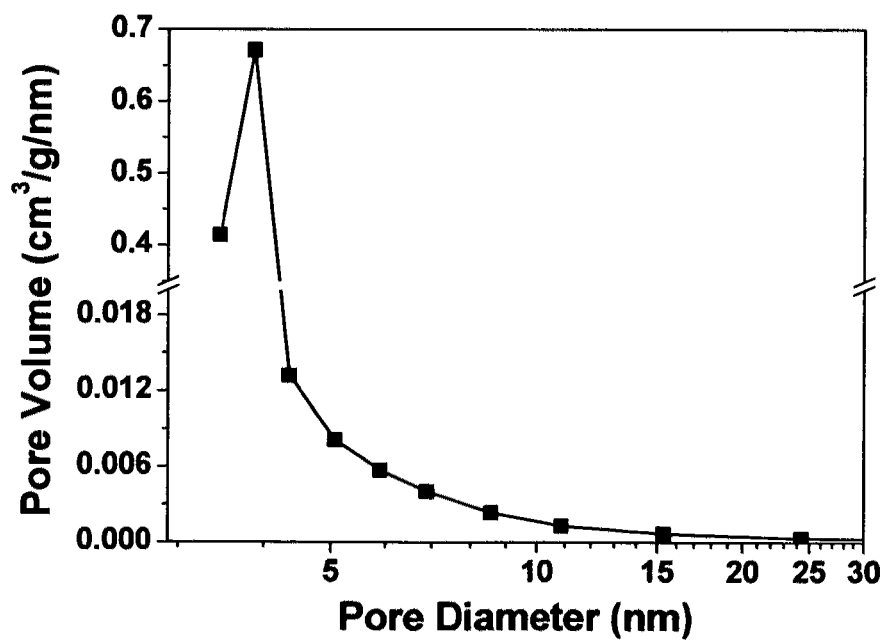

Representative scanning electron microscopy (SEM) images of the curved graphene sheets are shown in FIG. 1(a). This curved graphene sheet morphology appears to be capable of preventing graphene sheets from closely re-stacking with one another when they are packed or compressed into an electrode structure, thereby maintaining a meso-porous structure having a pore size in the range of 2 to 25 nm. The pore size data was obtained from low-temperature nitrogen sorption experiments by using a volumetric adsorption apparatus (Novell Instruments Corp., USA). Nitrogen adsorption isotherms of graphene (FIG. 2(a)) show type IV isotherm characteristics (characterized by a hysteresis loop), based on which, pore size distributions were obtained by means of the well-known BJH equation, as shown in FIG. 2(b).

In contrast, the graphene sheets (e.g. FIG. 1 (b)) prepared by conventional chemical routs tend to re-stack with one another, effectively reducing the useful surface areas. The inter-graphene gaps are clearly less than 1 nm. Evaluation of more than 200 samples of flat-shaped graphene sheet-based supercapacitors in our lab indicates that the specific capacitance can reach 100-150 F/g in aqueous electrolyte (KOH+water), but typically <30 F/g and more typically <10 F/g in ionic liquid electrolyte.

Figure 3A:
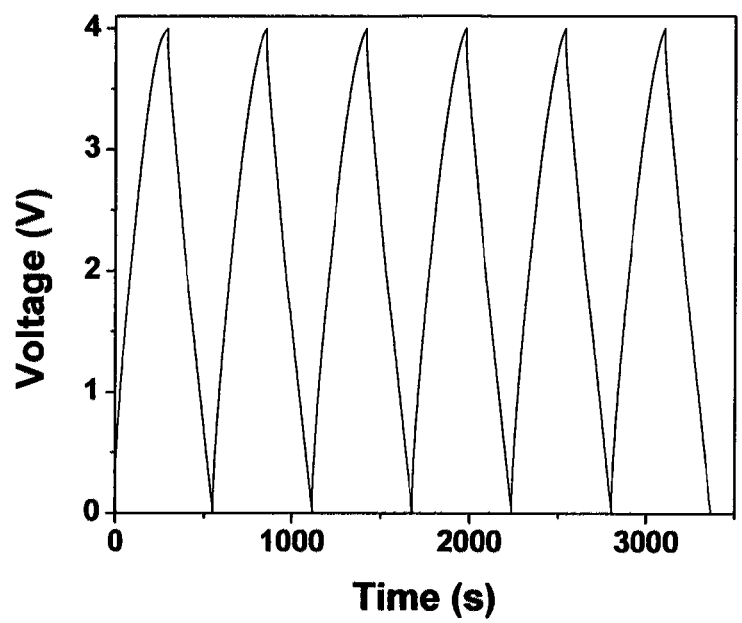
FIG. 3 (a) Galvanostatic charge-discharge curve of a curved graphene electrode (6.6 mg each) at a constant current density of 1 A/g, using EMIMBF4 ionic liquid electrolyte, and (b) cyclic voltammograms for graphene electrodes at different scan rates using EMIMBF4 ionic liquid electrolyte.

However, the specific capacitances of curved graphene-based supercapacitors in an ionic liquid are typically 100-250 F/g at a high current density of 1 A/g with a discharge voltage of 4.0 volts. As an example, for the sample corresponding to FIG. 1(a), the capacitance was 146.6 F/g at 1 A/g. The discharge curve is nearly a straight line, as shown in FIG. 3(a), meaning a good EDL performance. The ionic liquid, $EMIMBF_4$, can work at a voltage up to 4.5 V, leading to an excellent energy density. With the ionic liquid electrolyte, this sample exhibits an energy density of 81.4 Wh/kg at 1 A/g. This impressive result was achieved with a meso-porous structure of curved graphene sheets. Further improvements in energy density are very achievable with optimized mesoporous graphene compositions and structures.

Figure 3B:
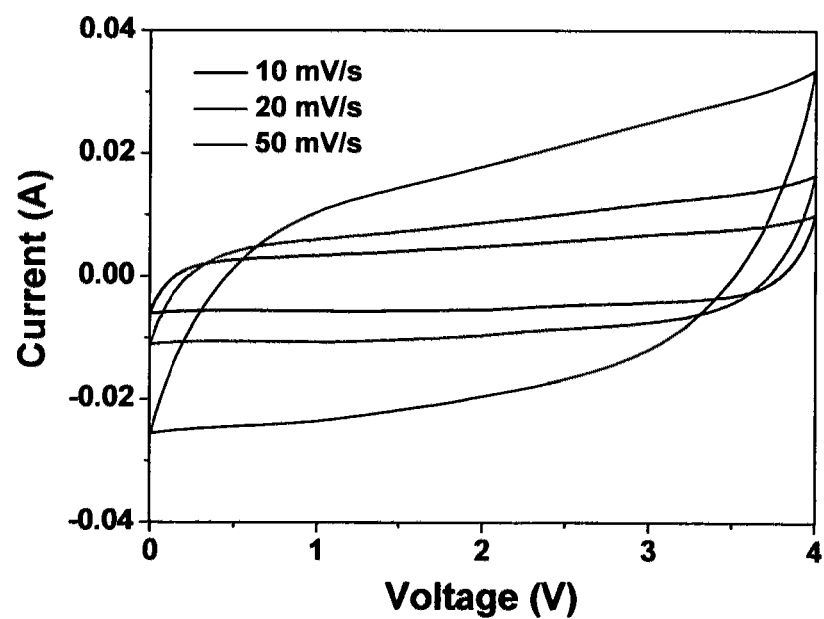

Conventional activated carbon has a significant amount of micro pores that are not accessible to even small electrolyte molecules (KOH in $H_2O$). Many of the slightly larger pores in AC would not be accessible to large electrolyte molecules, such as $EMIMBF_4$ as well. This implies that conventional AC may not be able to take full advantage of the high tolerable voltages of ionic liquids. The CV curves of curved graphene supercapacitors are shown in FIG. 3(b). The CV shape is nearly rectangular, indicating the ideal double layer capacitor behavior. This implies that the capacitance of the meso-porous graphene-based electrodes is free from pseudo-capacitance contribution.

The power density was calculated according to $P=E/\Delta t$, where E is the energy density, $\Delta t$ is the discharge time. The Ragone plot, the relationship between energy density and current density, and the discharge time curves of graphene supercapacitors were shown in FIG. 3(a), (b) and (c), respectively. The highest power density is 9,838 W/kg obtained at 8 A/g (with energy density of 53.1 Wh/kg at this point). Outstanding energy density values of 90, 85.6, 76.3, 67.7 and 53.1 Wh/kg were obtained at current density values of 0.5, 1, 2, 4 and 8 A/g, respectively, corresponding to charge/discharge times of 580, 270, 120, 50 and 20 seconds, respectively. This implies that one can now have an energy storage device capable of storing 67.7 Wh/kg (equivalent to that of a Ni metal hydride battery) and being completely re-charged in less than 2 minutes.

Figure 4A:
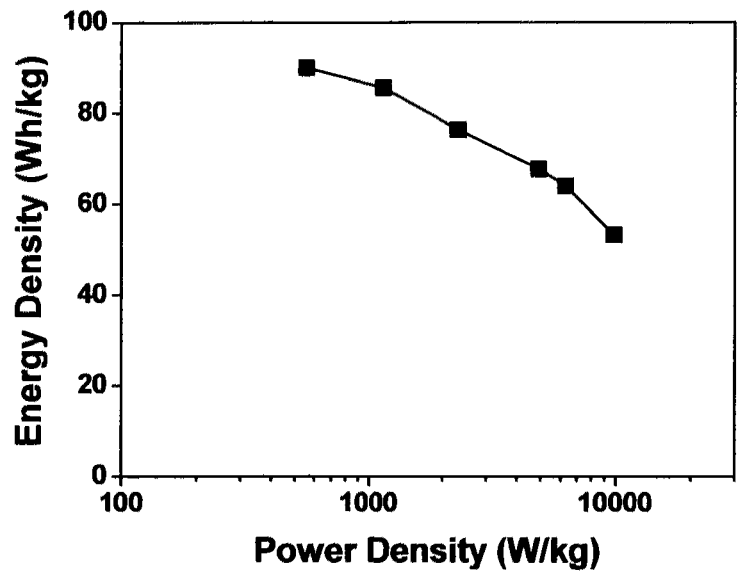
FIG. 4. (a) Relationship between the energy density and current density of a curved graphene electrode in EMIMBF4 ionic liquid electrolyte, (b) Ragone plot of graphene supercapacitor, (c) discharge curve at 2, 4 and 8 A/g current density, and (d) Nyquist plots for graphene electrodes with sinusoidal signal of 5 mV over the frequency range from 100 kHz and 1 mHz. Z': real impedance. Z": imaginary impedance.
Figure 4B:
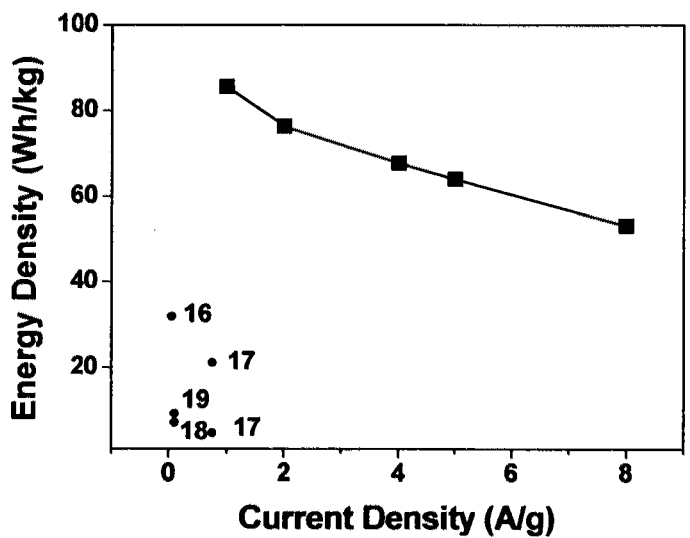
Figure 4C:
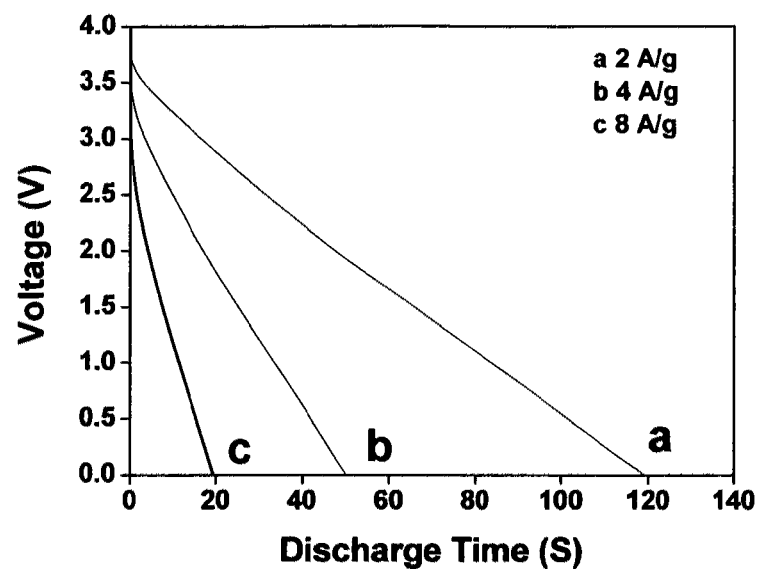
Figure 4D:
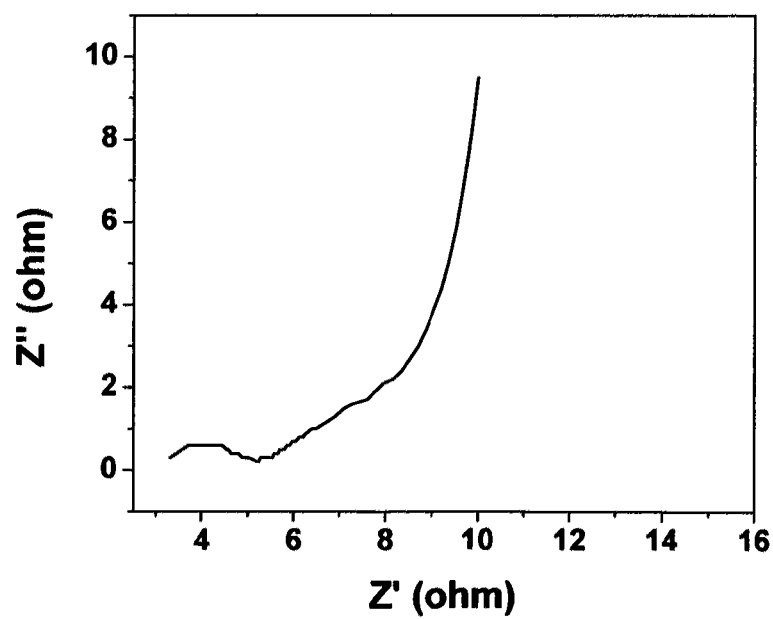

Compared with the literature data based on EDL alone, as shown in FIG. 4(b), the room temperature energy density of our curved graphene-based supercapacitors is much higher than the value of 31.9 Wh/kg (75 F/g) at 60° C. for a graphene-ionic liquid supercapacitor reported by Vivekchand, et al [16, listed below]. Our value is also dramatically higher than the values of 4.7 Wh/kg (135 F/g) and 21.5 Wh/kg (99 F/g) for a chemically modified graphene supercapacitor with aqueous and organic electrolytes, respectively, as reported by Stoller, et al [17]. Additionally, our data are far superior to the separately reported values of 7.1 Wh/kg (205 F/g) by Wang et al [18] and 9.2 Wh/kg (264 F/g) by Lu, et al [19]. In FIG. 4(d), the Nyquist plot of the curved graphene based supercapacitor shows a straight line in the low-frequency region and an arc in the high frequency region. This high frequency loop is related to the electronic resistance between graphene sheets. The vertical shape at lower frequencies indicates a pure capacitive behavior, representative of the ion diffusion in the electrode structure. The more vertical the curve, the more closely the supercapacitor behaves as an ideal capacitor. The magnitude of equivalent series resistance (ESR) of 3.31 ohm is obtained from the x-intercept of the Nyquist plot in FIG. 4(d). ESR data determines the rate that the supercapacitor can be charged/discharged. Although the ionic liquid has a viscosity higher than aqueous and organic electrolyte, the meso-porous structure (mostly 2-25 nm) constituted by curved graphene sheets remain capable of delivering a high power density.

16. Vivekchand, S. R.; Chandra, S. R.; Subrahmanyam, K. S.; Govindaraj, A.; Rao, C. N. *J. Chem. Sci.* 2008, 120, 9-13.
17. Stoller, M. D.; Park, S.; Zhu, Y.; An, J. H.; Ruoff, R. S. *Nano Lett.* 2008, 8, 3498-3502.
18. Wang, Y.; Shi, Z. Q.; Huang, Y.; Ma Y. F.; Wang, C. Y.; Chen, M. M.; Chen, Y. Y. *J. Phys. Chem. C* 2009, 113, 13103-13107.
19. W. Lv, et al. "Low-Temperature Exfoliated Graphenes: Vacuum-Promoted Exfoliation and Electrochemical Energy Storage," *ACS Nano* 2009, 3, 3730-3736.

EXAMPLE 2

Curved NGPs Further Treated with Poly(3-methyl-thiophene)

Electronically conductive polymers by themselves are promising supercapacitor electrode materials because the charge process involves the entire polymer mass and they provide low equivalent series resistance for the electrode. When combined with an NGP-type substrate material, the conducting polymer can impart pseudo-capacitance to the electrode. One desirable conductive polymer selected was poly(3-methyl-thiophene) (pMeT), particularly its p-doped variant. Poly(3-methyl-thiophene) could be synthesized by oxidative chemical polymerization technique using ferric chloride as a dopant in an inert atmosphere. However, we chose to prepare PMeT doped with different anions electrochemically in the presence of tetra-alkyl-ammonium salts using a carbon nodule-bonded NGP mat prepared in Example 1 as an electrode. The specific capacitance of a mat formed of curved NGPs and a curved NGP NGP mat with a pMeT treatment were found to be 146.6 F/g, and 296 F/g, respectively, when measured at a voltage of 4.5 volts at a current density of 1 A/g. In other words, the energy density was increased from 81.4 Wh/kg to 164.3 Wh/kg. This energy density value of 164.3 Wk/Kg is the highest ever reported for carbon material-conducting polymer redox pair-based pseudocapacitors. These data have clearly demonstrated that the presently invented curved NGP approach is surprisingly effective in helping NGP-based electrodes to achieve a much higher capacitance as compared with flat NGP-based electrodes.

This impressive result was achieved with low-cost NGPs, as opposed to expensive CNT-based materials. A multi-wall CNT/poly(3,4-ethylenedioxythiophene) composite, prepared by chemical or electrochemical polymerization, when evaluated in 1 M $H_2SO_4$, 6 M KOH, or 1 M tetraethylammonium tetrafluoroborate (TEABF4) in acetonitrile, exhibited capacitance values of 60 to 160 F/g. However, CNT materials are much more expensive.

In conclusion, we have successfully developed a new and novel class of curved nano graphene platelets that are superior supercapacitor electrode materials. A supercapacitor can make use of this material in one or both of the electrodes. These curved NGP-based nano materials exhibit exceptionally high capacitance and ultra-high energy density. Other desirable features of NGPs include chemical stability and low mass density. They are also of lower costs compared with carbon nano-tube based materials. Curved NGPs can be mass-produced cost-effectively.

The present discovery is of great scientific and technological significance:
1. Technologically, the nano graphene-based, ionic liquid-enabled supercapacitor provides a specific energy density of 81.6 Wh/kg (based on the total electrode weight) at room temperature, measured at a current density of 1 A/g (corresponding to a high charge/discharge rate).
   a) This is the highest energy density value ever reported for nano carbon material-based supercapacitors based on electric double layer (EDL) mechanism only, without any contribution from redox-type pseudo-capacitance mechanism. With a contribution from pseudocapacitance (e.g. from a graphene-conductive polymer redox pair), an energy density of 164 Wh/Kg was achieved. This is also the highest energy density value ever reported for carbon material based pseudocapacitors.

b) These energy density values are comparable to that of the Ni metal hydride battery. This new technology provides an energy storage device that stores nearly as much energy as in a battery, but can be recharged in seconds or minutes. Batteries typically cannot be recharged in seconds or a few minutes. This is truly a breakthrough in energy technology.

2. Since our research group's 2006 discovery that graphene can be used as a supercapacitor electrode material, scientists around the globe have been making some strides in improving the specific capacitance of graphene-based electrodes. However, the results still fall sort of the theoretical capacitance of 550 F/g. Despite the theoretically high specific surface area of single-layer graphene (up to 2,675 $m^2$/g), this value has not been achieved in a real supercapacitor electrode due to the high tendency for graphene sheets to re-stack together. To this end, our research has made the following scientific contributions:

a) In this patent application, we point out that the best strategy to achieve a high capacitance in graphene-based electrodes is to find a way to effectively prevent graphene sheets from sticking to one another face-to-face.

b) This face-to-face aggregation of graphene sheets can be effectively prevented if curved graphene sheets (instead of flat-shaped) are prepared.

c) This curved graphene morphology enables the formation of meso-pores (>2 nm) that are readily accessible and wettable by ionic liquids, which are significantly larger in molecular size than, for instance, KOH or $H_2O$ in the conventionally used aqueous electrolyte. In order to take advantage of the high operating voltage of ionic liquids (>4 volts), the pore sizes must be sufficiently large to let the ionic liquid enter the pores and form double layers of charges therein. No prior art work has recognized or addressed this scientifically significant issue.

We claim:

1. A supercapacitor comprising a first electrode, a second electrode, a porous separator disposed between the first and the second electrode, and an ionic liquid electrolyte in physical contact with the two electrodes, wherein at least one of the two electrodes comprises a meso-porous structure being formed of a plurality of curved nano graphene platelets or sheets that are packed to prevent graphene re-stacking and to form said meso-porous structure having multiple inter-layer pores between the graphene sheets having a pore size in the range of 2 nm and 25 nm, which are accessible to said ionic liquid electrolyte and wherein said nano graphene platelets or sheets are activated to form activated platelets or sheets.

2. The supercapacitor of claim 1 wherein said multiple pores have a pore size in the range of 3 nm and 25 nm.

3. The supercapacitor of claim 1 wherein said multiple pores have a pore size in the range of 4 nm and 15 nm.

4. The supercapacitor of claim 1 wherein both of the first electrode and the second electrode comprise a meso-porous structure being formed of a plurality of curved nano graphene platelets or sheets that are packed to prevent graphene re-stacking and to form said meso-porous structure having multiple inter-layer pores between the graphene sheets having a pore size in the range of 2 nm and 25 nm, which are accessible to said ionic liquid electrolyte.

5. The supercapacitor of claim 1 wherein said ionic liquid is a room temperature ionic liquid.

6. The supercapacitor of claim 1 wherein said ionic liquid has a molecular size smaller than a pore size of the multiple pores.

7. The supercapacitor of claim 1 wherein a pore size of the multiple pores is at least three times greater than a molecular size of the ionic liquid.

8. The supercapacitor of claim 1 wherein said nano graphene platelets or sheets comprise single-layer graphene.

9. The supercapacitor of claim 1 wherein said nano graphene platelets or sheets comprise an oxidized graphene or graphene oxide sheet.

10. The supercapacitor of claim 1 wherein said nano graphene platelets or sheets comprise a chemically or thermally reduced graphene oxide sheet.

11. The supercapacitor of claim 1 wherein said at least one of the electrodes further comprises a nano material selected from a carbon nano-tube, carbon nano-fiber, activated carbon, carbon black, nano-wire, metal oxide nano-wire or fiber, conductive polymer nano-fiber, or a combination thereof.

12. The supercapacitor of claim 1 wherein at least one of the electrodes further comprises a material selected from the group consisting of $RuO_2$, $IrO_2$, NiO, $MnO_2$, $VO_x$, $TiO_2$, $Cr_2O_3$, $Co_2O_3$, $PbO_2$, $Ag_2O$, $MoC_x$, $Mo_2N$, $WC_x$, $WN_x$, a transition metal oxide, and combinations thereof.

13. The supercapacitor of claim 1 wherein said at least one of the electrodes further comprises a conductive polymer that forms a redox pair with a nano graphene platelet or sheet.

14. The supercapacitor of claim 1 wherein said nano graphene platelets or sheets are functionalized.

15. The supercapacitor of claim 1 wherein said nano graphene platelets or sheets are functionalized with one or more functional groups selected from the group consisting of —$SO_3$, —R'COX, —R'(COOH)$_2$, —CN, —R'CH$_2$X, —OH, —R'CHO, —R'CN, wherein R' is a hydrocarbon radical, and wherein X is —NH$_2$, —OH, or a halogen.

16. The supercapacitor of claim 1 wherein said activated platelets or sheets are functionalized.

17. The supercapacitor of claim 1 wherein said supercapacitor provides an energy density of no less than 50 Wh/kg based on the total electrode weight.

18. The supercapacitor of claim 1 wherein said supercapacitor provides a specific capacitance from 100 to 250 F/g.

19. The supercapacitor of claim 1 wherein said ionic liquid is operated up to at least 3.5 volts.

20. The supercapacitor of claim 1 wherein said ionic liquid is operated up to at least 4.5 volts.

21. A supercapacitor comprising a first electrode, a second electrode, a porous separator disposed between the first and the second electrode, and an ionic liquid electrolyte in physical contact with the two electrodes, wherein at least one of the two electrodes comprises a meso-porous structure being formed of a plurality of curved nano graphene platelets or sheets that prevent graphene re-stacking and that are packed to form said meso-porous structure containing multiple inter-layer pores between the graphene sheets having a pore size in the range of 2 nm and 25 nm which are accessible to said ionic liquid electrolyte, wherein said graphene platelets or sheets are not spacer-modified or surface-modified platelets or sheets and wherein said nano graphene platelets or sheets are either activated to form activated platelets or sheets or functionalized with one or more functional groups selected from the group consisting of —$SO_3$, —R'COX, —R'(COOH)$_2$, —CN, —R'CH$_2$X, —OH, —R'CHO, —R'CN, wherein R' is a hydrocarbon radical, and wherein X is —NH$_2$, —OH, or a halogen.

22. The supercapacitor of claim 21, wherein both first and second electrodes comprise a meso-porous structure being formed of a plurality of curved nano graphene platelets or sheets that prevent graphene re-stacking and that are packed to form said meso-porous structure containing multiple inter-layer pores between the graphene sheets having a pore size in the range of 2 nm and 25 nm which are accessible to said ionic liquid electrolyte, wherein said graphene platelets or sheets are not spacer-modified or surface-modified platelets or sheets.

23. The supercapacitor of claim 21 wherein said ionic liquid is a room temperature ionic liquid.

24. The supercapacitor of claim 21 wherein a pore size of the multiple pores is at least three times greater than a molecular size of the ionic liquid.

25. The supercapacitor of claim 21 wherein said nano graphene platelets or sheets comprise single-layer graphene or graphene oxide.

26. The supercapacitor of claim 21 wherein at least one of the electrodes further comprises a material selected from the group consisting of $RuO_2$, $IrO_2$, $NiO$, $MnO_2$, $VO_x$, $TiO_2$, $Cr_2O_3$, $Co_2O_3$, $PbO_2$, $Ag_2O$, $MoC_x$, $Mo_2N$, $WC_x$, $WN_x$, a transition metal oxide, and combinations thereof.

27. The supercapacitor of claim 21 wherein said at least one of the electrodes further comprises a conductive polymer that forms a redox pair with a nano graphene platelet or sheets.

28. The supercapacitor of claim 21 wherein said nano graphene platelets or sheets are activated to form activated graphene platelets or sheets.

29. The supercapacitor of claim 21 wherein said nano graphene platelets or sheets are functionalized.

* * * * *